Sept. 16, 1969     D. C. FRICKER     3,467,817

TEMPERATURE CONTROL CIRCUIT

Filed Feb. 23, 1967

Inventor
David C. Fricker
By Gerrit D. Foster
Attorney

United States Patent Office 3,467,817
Patented Sept. 16, 1969

3,467,817
TEMPERATURE CONTROL CIRCUIT
David C. Fricker, Campbellsport, Wis., assignor to The West Bend Company, West Bend, Wis., a corporation of Wisconsin
Filed Feb. 23, 1967, Ser. No. 617,906
Int. Cl. H05b 1/02
U.S. Cl. 219—501                                    8 Claims

ABSTRACT OF THE DISCLOSURE

A temperature sensing and control circuit for heating-type electric appliances. The circuit has a positive temperature coefficient resistor which continually senses the heat rise imparted to a medium due to an electrical-thermal energy transfer from a heater to the medium. This resistor is in a simple charging circuit with a charging capacitor to provide phase control of the trigger voltage impressed on the trigger of a full wave semiconductor device. When the temperature sensed by the resistor reaches, say 70% of the final desired temperature, the knee or switch point of the PTC resistor is reached and its resistance rapidly increases with increased temperature and the resultant phase control causes the semiconductor device to conduct later and later in the voltage cycle decreasing the power to the heater until the thermal equilibrium has been attained.

BACKGROUND OF THE INVENTION

Field of invention

This invention relates to the control of the energy delivered from a source of alternating voltage (AC power) to a load such as the heater of a coffee percolator. This control is of a proportional nature and lowers the energy delivered in such infinitesimal increments as to achieve a stepless decrease in power to the heater.

DESCRIPTION OF THE PRIOR ART

One circuit for the control of a coffee percolator has been described in an article by D. R. Grafham of the Semiconductor Products Department of General Electric Co. It employs a negative temperature coefficient thermistor which when cold will not permit triggering of an SCR unit which controls the circuit to a warm element (50 watt). When the temperature of the coffee reaches its brewed state this thermistor fires and the high resistance warm element is on the line in series with the percolate element (600 watt) and the current is drastically reduced. This circuit has two heating elements and utilizes only a half cycle of the AC line. It is consequently complex and expensive.

The control of power supplied by the control of the wave shape or the portion of a cycle in which there is current present is shown in U.S. Patents 3,061,744, 3,070,739, 3,131,545, 3,136,877, 3,188,490, 3,194,973, 3,209,228, 3, 229,379, 3,235,711, 3,257,566, 3,277,362, and others.

The use of variable resistance to sense temperature changes is shown in U.S. Patents 3,131,545, 3,229,379, 3,235,711, 3,240,916. However this prior art is not designed to accomplish the control of the power supplied starting only when say 70% of the final desired temperature is reached. In other words, this prior art does not disclose a positive temperature coefficient resistor which sharply increases its resistance at a knee or switch point placed in the charging circuit to provide the phase control of the trigger voltage of a full wave semi-conductor device.

SUMMARY OF THE INVENTION

The essence of this invention is the control of a proportional power controller for appliances by means of a simple resistance capacitance charging circuit which includes a barium titanate sensor resistor with a positive temperature coefficient (herein designated PTC) with a resistance-temperature characteristic similar to that shown in the curve of FIG. 2. The circuit of the proportional power controller includes a multilayer semiconductor such as is known in the trade as a thyristor. This acts as a switch which when energized permits the application of power to the load from both the positive and negative half cycles of a source of alternating voltage. The point on the wave at which this switch closes is dependent upon the time that is required to trigger such element by the resistance-capacitance charging circuit. With the resistance value low the charging capacitor fires at the beginning of each half cycle and full power is delivered. When the resistance rapidly increases at the knee or switch point of the PTC resistor, the time needed to raise the voltage on the charging capacitor up to the trigger voltage is increased so that the switching of the semi conductor occurs later in the cycle and the power source is connected to the load only during a portion of each half cycle. The fast increase in the resistance is accomplished in increments so small that the power is effectively reduced steplessly until the PTC resistor reaches a point of balance or thermal equilibrium. This occurs when the resistance of the PTC does not increase further because the power delivered to the load becomes sufficient to maintain its present resistance. Thus this circuit can be used to maintain a temperature.

DESCRIPTION OF THE PREFERRED EMBODIMENT

Figure 1:
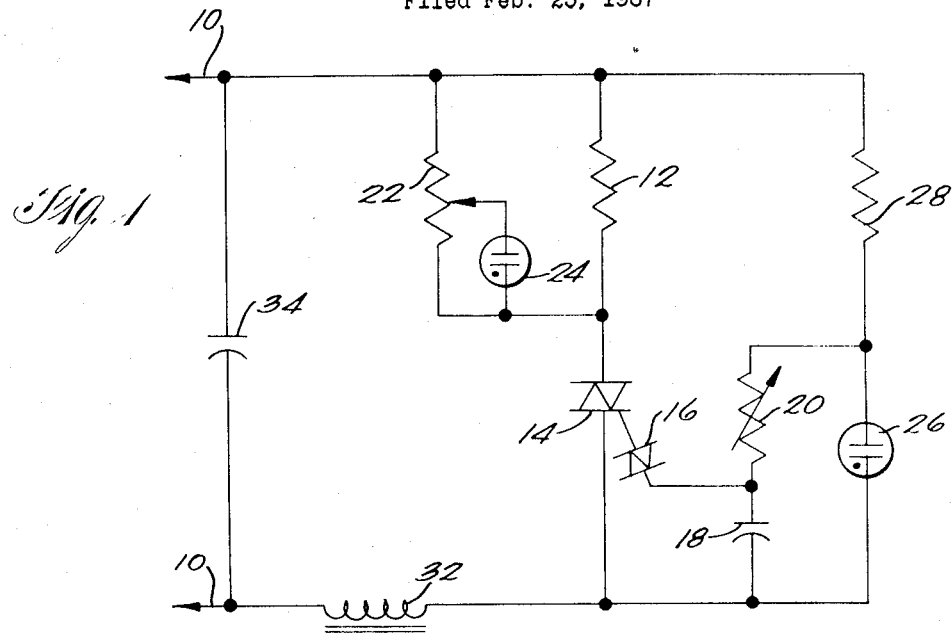
FIG. 1 is a schematic diagram of the temperature sensing and control circuit embodying this invention.
Figure 2:
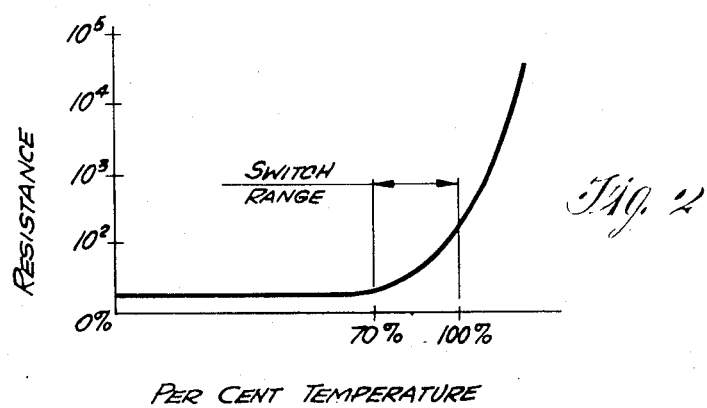
FIG. 2 is a graphical representation showing the manner in which the resistance of the PTC increases with percent of temperature.

Referring to the drawing by reference numerals the temperature sensing and control circuit for electric heating of appliances includes a source of alternating sinusoidal power such as an AC line 10. A heating resistance 12 such as is customarily used in a coffee maker is connected across such source through a multilayer semiconductor 14, known as a thyristor. This is a full wave device which may include as an integral part a trigger shown schematically at 16. This trigger is connected as shown to a simple charging circuit consisting of a charging capacitor 18 and a barium titanate sensor resistor 20. This sensor component has a positive temperature coefficient (PTC) which is designed to have the resistance temperature characteristics shown in the graphical representation of FIG. 2. This PTC sensor may be securely mounted on the bottom of a coffee maker in good thermal-physical bond so that it may accurately sense the temperature of the brew within the coffee maker.

A neon pilot light 24 may be connected across the load through a trimmer potentiometer 22 as shown. This is a divider network which adjusts the voltage to the neon tube so that it lights at the beginning of the brew cycle and goes out close to the end of such cycle.

For circuit stability and the elimination hysteresis or snap back effect a voltage regulator consisting of a neon regulator light 26 and a limiter resistor 28 are connected in series across the power source as shown. The charging circuit is connected to this voltage regulator between the light 26 and resistor 28. This regulator will permit a variation of line voltage between 100 and 135 volts without detrimental effect to the brewing cycle, and will also eliminate any harmful hysteresis or snap back effect. Hysteresis causes the thyristor to refire too early in each cycle. Such early refiring results in excess power and repercolating may occur.

The steep rapid action of the semi-conductor switch 14–16 sets up harmonics which might be translated back into the line and be detrimental to other users of such line. To prevent such feed back a loss pass filter consisting of a capacitor 34 and an inductance 32 is connected as shown. These components function in a well-known manner to prevent high frequency harmonics from feeding back into the line.

Since the water in the coffee maker is generally at or below room temperature at the beginning of the brew cycle, the resistance of the sensor 20 is low allowing charging capacitor 18 to charge immediately. When power is applied initially to the circuit, the heater element 12 receives full power. The heater continues to receive full power until 70 percent of the desired cut-off temperature is reached. At this point (switch point) which for a coffee maker is approximately 150° F., the power is slowly and steplessly decreased until the desired cut-off temperature is reached (approximately 187° F.). At this point the "sensor thermal-equilibrium" is reached. The brewed coffee is maintained at this thermal balance temperature which approximates the cut-off temperature, thus eliminating any need for a separate "keep warm" heater unit.

The proportional power taper from 150 to 187° F. (typical values) has greater significance than the "ON to OFF" thermostat function now used in many coffee makers. The operation of the circuit of this invention improves the quality of the coffee brew. In conventional coffee makers, the heating element receives full power until cut-off temperature is reached. In such a case, the heating element during the last few minutes of the brew cycle has reached a very high temperature. This high temperature of the heater causes burning of the extracted coffee oils in its proximity.

With the proportioning power taper of this invention the temperature of the heater is decreased (because of decreased electrical power) during the last minutes of the brew cycle (150° F.–187° F.). The more constant temperature is thus maintained in both the heater element and the water being pumped over the coffee grounds, thus improving the quality of the brew.

I claim:
1. A temperature sensing and control circuit comprising:
   a source of alternating power;
   a heating resistor adapted to effect a heat rise to a medium;
   a full wave semi-conductor switch connected in series with said heating resistor across such source; and
   a charging circuit for said switch directly connected therewith consisting of a charging capacitor and a sensor resistor connected in series across said source, said switch being connected to said charging circuit between said charging capacitor and said sensor resistor, said sensor resistor being in close heat transfer relationship with the medium and having a positive temperature coefficient and characterized by having a sharp knee point in its temperature resistance curve.

2. A temperature sensing and control circuit as set forth in claim 1 wherein said sensor resistor has a resistance to percent of temperature curve with a switch range of from about 70% to about 100% of the final desired temperature for the medium.

3. A temperature sensing and control circuit as set forth in claim 1 wherein said sensor resistor is a barium titanate unit having a knee point commencing when the temperature of the medium approaches approximately 70% of the final desired temperature.

4. A temperature sensing and control circuit as set forth in claim 1 wherein said sensor resistor is a barium titanate unit having a knee point commencing when the temperature of the medium approaches approximately 150° F.

5. A temperature sensing and control circuit as set forth in claim 1 wherein said sensor resistor is a barium titanate unit having a knee point commencing when the temperature of the medium approaches approximately 150° F. and the relationship between the medium, the heating resistor and said sensor resistor reaches a thermal equilibrium.

6. A temperature sensing and control circuit as set forth in claim 5 wherein said thermal equilibrium is reached at approximately 187° F.

7. A temperature sensing and control circuit as set forth in claim 1 wherein there is a voltage regulator and hysteresis eliminator in said charging circuit.

8. A temperature sensing and control circuit as set forth in claim 7 wherein said voltage regulator and hysteresis eliminator consists of a neon regulator light and a limiter resistor.

References Cited
UNITED STATES PATENTS

| | | | |
|---|---|---|---|
| 3,254,838 | 6/1966 | Chambers | 219—501 |
| 3,385,957 | 5/1968 | Munson et al. | 219—501 |
| 3,187,164 | 6/1965 | Andrich | 219—504 |

BERNARD A. GILHEANY, Primary Examiner

F. E. BELL, Assistant Examiner

U.S. Cl. X. R.

219—505